Dec. 2, 1969  H. LIST  3,480,997
APPARATUS FOR THE THERMAL TREATMENT OF PLASTIC MATERIALS
Filed Aug. 18, 1967  2 Sheets-Sheet 1
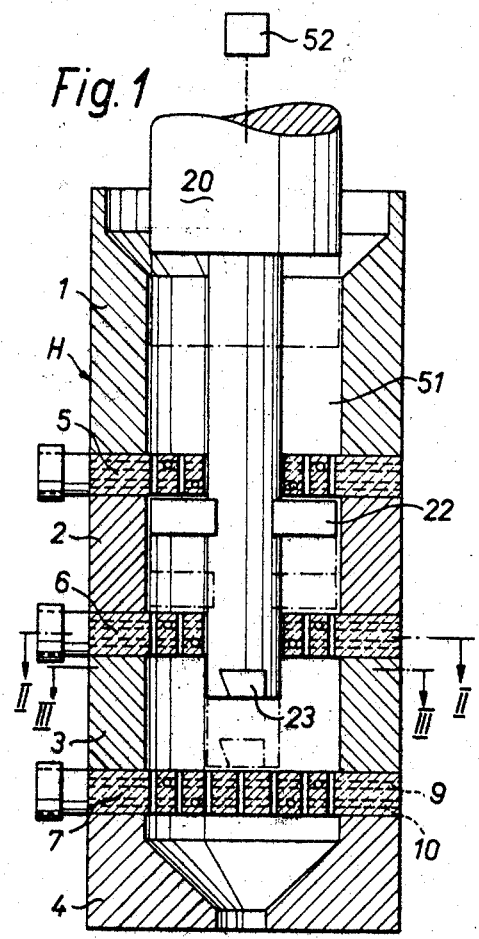
Fig. 1
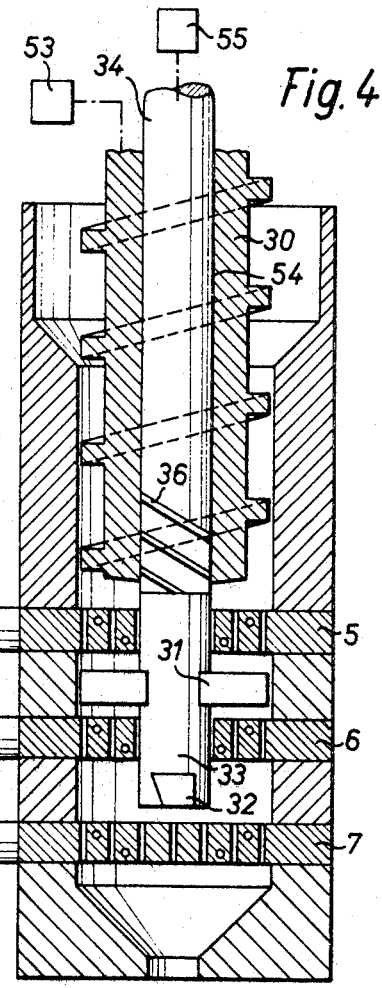
Fig. 4
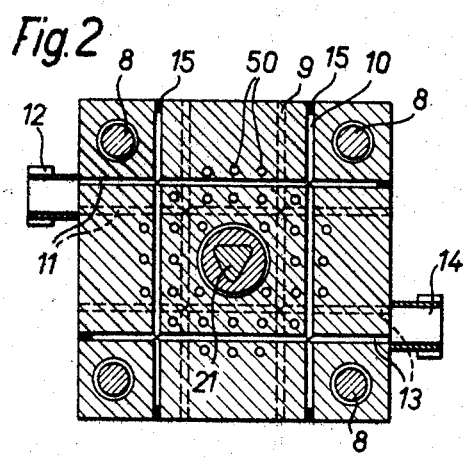
Fig. 2    Fig. 3
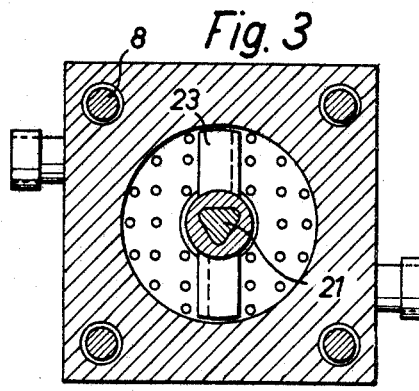
INVENTOR
HEINZ List
BY Jacobi & Davidson
ATTORNEY Dec. 2, 1969  H. LIST  3,480,997
APPARATUS FOR THE THERMAL TREATMENT OF PLASTIC MATERIALS
Filed Aug. 18, 1967  2 Sheets-Sheet 2
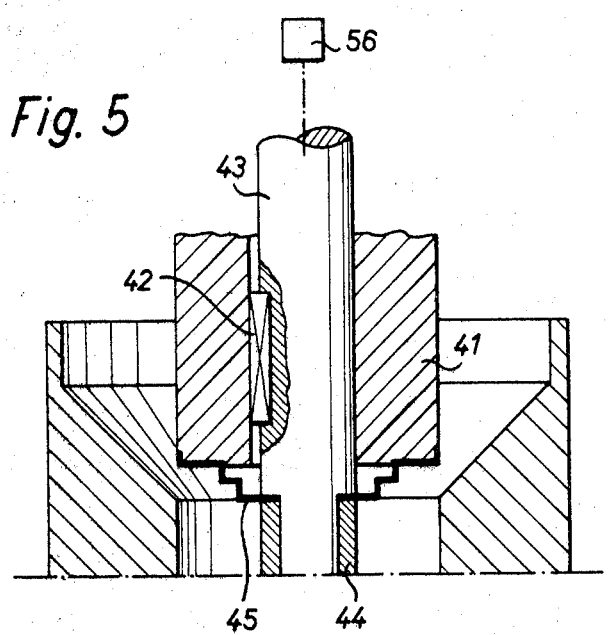
INVENTOR
Heinz List
BY Jacobi & Davidson
ATTORNEY United States Patent Office 3,480,997
Patented Dec. 2, 1969

3,480,997
APPARATUS FOR THE THERMAL TREATMENT OF PLASTIC MATERIALS
Heinz List, St. Jakobstrasse 43,
Pratteln, Switzerland
Filed Aug. 18, 1967, Ser. No. 661,659
Claims priority, application Switzerland, Aug. 22, 1966,
12,184/66
Int. Cl. B29f 3/02
U.S. Cl. 18—12                                    10 Claims

ABSTRACT OF THE DISCLOSURE

An apparatus for the thermal treatment, such as heating, cooling, melting, plasticizing and crystallizing plastic products which comprises a housing means and a plurality of heated or cooled perforated or apertured plates arranged behind one another in the aforesaid housing means. Additionally, stirrer and kneading elements are disposed between the apertured plates, and feed means which may be in the form of a worm or a piston serve to press the product through the apertured plates. The inventive apparatus is constructed in such a manner that the product during its feed through the housing means is subjected to a pronounced oscillation by carrying out an oscillatory movement between the stirrer and kneading elements and the apertured plate surfaces or housing surfaces.

BACKGROUND OF THE INVENTION

The present invention relates to an improved apparatus for the thermal treatment, such as for instance heating, cooling, fusing, plasticizing and crystallization of plastic products.

The plastic, highly viscous, aggregate condition presents particular problems for the heat transmission, particularly with products having a small coefficient of thermal conductivity. The rapid renewal of the boundary layers at the heat-transmitting surfaces required for the heat transfer and the pronounced movement of the product which is indispensible for convection, necessitates special mechanical stirrer- and kneading means. Even so, the nonetheless low heat transmission factor additionally further requires large heat transfer surfaces at product layers which are as thin as possible.

Prior art solutions of the problem resort to kneading rollers or drums and worm kneaders which are of single or multi-shaft constructions. Of these, one physical embodiment is particularly worthy of mention, and wherein the worm carries out in addition to its rotation an axially oscillating movement. In this case, heat is transmitted by the worm and the housing. The worm acts as a feed element and heat transfer surface. On the other hand, kneading worms which only rotate are also known to the art, and wherein the kneading action is increased by the provision of unheated perforated or apertured plates between the worm spirals or helixes.

SUMMARY OF THE INVENTION

Accordingly, it is a primary object of the present invention to provide an improved apparatus for the thermal treatment of plastic products which effectively overcomes the drawbacks of the prior art structures heretofore mentioned.

Another, more specific object of the present invention relates to an improved apparatus for the thermal treatment of plastic products which is relatively simple in construction, economical to manufacture, highly reliable and efficient in its operation, and not readily subject to breakdown.

Now, it has been found that the heat transfer or transmission at plastic, highly viscous materials can be carried out quite effectively in an apparatus embodying a housing having a worm or a piston as the feed element for pressing the product through apertured plates which are heated or cooled and arranged behind one another, and wherein stirrer- and kneading elements are arranged between the aforementioned apertured plates. The inventive apparatus is characterized by the features that the apparatus is constructed in such a manner that the product along its feed path is subjected to a pronounced oscillation by carrying out an oscillatory movement between the stirrer- and kneading elements and the surfaces of the apertured plates or housing. As a result, there is not only imparted a rotational movement to the product, but also a pronounced oscillatory movement which considerably improves the heat transfer factor.

BRIEF DESCRIPTION OF THE DRAWINGS

The invention will be better understood, and objects other than those set forth above, will become apparent, when consideration is given to the following detailed description thereof. Such description makes reference to the annexed drawings wherein:

FIGURE 1 is a longitudinal sectional view through a first embodiment of inventive apparatus incorporating a rotatably entrained press piston or ram as the feed element;

FIGURE 2 is a cross-sectional view through an apertured plate of the apparatus of FIGURE 1, taken along the line II—II thereof;

FIGURE 3 is a cross-sectional view of the apparatus of FIGURE 1, taken along the line III—III thereof;

FIGURE 4 is a longitudinal sectional view through a further embodiment of inventive apparatus equipped with an idle independently rotating form as the feed element; and FIGURE 5 is a longitudinal sectional view through a sealing portion of a further embodiment of apparatus incorporating a rotating press piston or ram as the feed element and independently oscillating kneading elements.

DESCRIPTION OF THE PREFERRED EMBODIMENTS

Describing now the drawings, in the exemplary embodiment of apparatus depicted in FIGURE 1 and the associated cross-sectional views of FIGURES 2 and 3, the housing H of the apparatus is composed of an infeed portion 1, the intermediate plates 2 and 3, as well as the discharge portion 4. Further, it will be recognized that perforated or apertured plates 5, 6 and 7 are mounted between these housing portions 1, 2, 3 and 4, by means of the schematically illustrated screws 8 or equivalent fastening expedients. Additionally, it should be understood that the housing portions 1, 2, 3 and 4 as well as also the apertured plates 5, 6 and 7 can be electrically heated by means of induction or resistance wires, or further can also be heated or cooled by a suitable fluid heat transmission agent.

In the represented figures there has only been shown the arrangement of the heating channels 9 and 10 at the apertured plates 5, 6 and 7. These channels 9 and 10 are arranged in two planes located between the rows of apertures or bores 50. After these channels 9 and 10 are bored or otherwise formed they are sealed at their ends by the stoppers 15, with the exception of the inlet 11 which is provided with the pipe or nipple 12 and the outlet 13 which is provided with the pipe or nipple 14. These pipes or nipples 12 and 14 are situated diametrically opposite one another, in other words at opposite sides of the associated apertured plate member 5, 6 or 7. The heat transmission agent which enters through the infeed nipple or pipe 12 divides into two streams at the intersection of the channels 9 and 10, is again combined and discharges at the discharge pipe 14. A piston or ram 20 located in the housing H functions as a feed element, and includes an extended portion or rod 21 having a substantially polygonal cross-sectional configuration, to which so-called stirrer-worms 22 and 23 are secured. The piston 20 and the stirrer elements 22 and 23 carry out the following movements in the present embodiment, namely: Firstly, a slow axial up and down feed movement, secondly, a superimposed rapid axial oscillation which imparts to the product strong or pronounced impulse movements, as well as thirdly, a rotation which particularly acts as a mixing motion of the stirrer elements between the aperture plates and upon the product.

The product, for instance a plastic, which is to be processed or melted or plasticized, is filled into the infeed housing portion or funnel 1 in the form of powder or granulate. In the upper position of the piston 20 shown in full lines, the granulate or the like flows into the pressure or compression compartment 51 located above the first perforated or apertured plate 5. During descent of the piston 20, until it assumes the phantom line position of FIGURE 1, the product is pressed through the uppermost apertured plate 5. After the piston 20 has been retracted and assumes the starting position, new product again flows into the infeed housing portion 1, and when there is a renewed downward movement of this piston 20 this new product is also pressed through the apertured plates, so that a continuous feed motion is obtained from the infeed end to the discharge end of the apparatus.

Owing to the rotation of the stirring- and kneading elements 22, 23 which are disposed between the heated apertured plates 5, 6 and 7, the product is always thoroughly mixed and homogenized. However, the product is subjected to particularly strong motion impulses by virtue of the additional axial oscillation of the aforementioned stirrer elements. The requisite movement of the aforedescribed components can be obtained by any suitable drive mechanism known to the art and which has been schematically depicted in FIGURE 1 by reference numeral 52. Furthermore, it should be understood that the excellent effect of the apparatus can be attributed, on the one hand, to the large shearing forces to which the product is subjected owing to the throttle action of the apertured plates 5, 6 and 7 and the rotation and oscillation of the stirrer elements 22 and 23. These shearing forces are transformed directly at the product into heat. Additionally, there is added the quantity of heat which is directly transmitted from the heated surfaces to the product. On the one hand, these surfaces are considerably enlarged by virtue of the apertured plates with respect to the conventional apparatuses. On the other hand, the heat transfer is improved by the differences in velocity which occur during oscillation. In many cases, the mechanical generation of heat is so great that the apertured plates 5, 6 and 7 must be cooled.

The embodiment of apparatus depicted in FIGURE 4 only employs a rotating worm 30 as the feed element, and which is rotatably driven by the schematically depicted drive means 53. The rotating and oscillating stirrer elements 31 and 32 are secured to a substantially polygonal-shaped portion 33 of a shaft 34 which extends through the central bore 54 of the worm 30 to a schematically illustrated drive mechanism 55. It will be understood that the worm 30 only rotates, whereas the shaft 34 rotates and oscillates independently thereof. A suitable worm groove 36 prevents throughpassage of the product between the worm 30 and the stirrer shaft 34. The mode of operation is the same as that considered with regard to the embodiments of FIGURES 1 to 3. The worm 30 serving as the feed element, however, permits a completely continuous mode of operation and a compact construction of the apparatus since, owing to the elimination of the axial feed movement of the press ram or piston of FIGURE 1, here the spacing between the apertured plates 5, 6 and 7 can be maintained smaller.

Finally, reference is made to the embodiment of apparatus depicted in FIGURE 5 which incorporates a further variation of the movements of the elements. More precisely, a press piston or ram 41 is rotatably coupled by a key member 42 or the like with a stirrer shaft 43 and the stirrer elements 44 secured thereon. The oscillations of the stirrer shaft 43, however, take place independently of the press piston or ram 41, whereby a membrane 45, on the one hand, provides the necessary freedom of axial motion and, on the other hand, insures for the sealing between the press ram or piston 41 and the stirrer shaft 43. Once again, a schematically depicted drive mechanism 56 imparts the requisite movement to the aforedescribed elements.

The movements heretofore described with the various embodiments depicted in the figures of the drawings, by way of example, can be carried out not only with a worm as the feed element but also with a press ram or piston as the feed element. Likewise, the feed movement can be carried out, in known manner, horizontally or inclined, and the heating and cooling can can be performed in individual, separate zones. Also, the different discharge forms, as such are known in presses of all types, can also be combined without difficulty with the inventive embodiments of apparatus.

While there is shown and described present preferred embodiments of the invention, it is to be distinctly understood that the invention is not limited thereto but may be otherwise variously embodied and practiced within the scope of the following claims.

Accordingly, what is claimed is:

1. Apparatus for the thermal treatment, such as heating, cooling, melting, plasticizing and crystallizing of plastic products, comprising, in combination,
   (a) housing means,
   (b) a plurality of temperature-controlled apertured plates arranged behind one another in said housing means,
   (c) stirrer and kneading elements disposed between said apertured plates,
   (d) feed means for pressing the product through said apertured plates, and
   (e) means for subjecting the product during its feed through said housing means to a pronounced oscillation by carrying out an oscillatory movement between said stirrer and kneading elements and said apertured plates.

2. Apparatus as defined in claim 1, wherein said temperature-controlled apertured plates are heated.

3. Apparatus as defined in claim 1, wherein said temperature-controlled apertured plates are cooled.

4. Apparatus as defined in claim 1, wherein said feed means comprises a press piston.

5. Apparatus as defined in claim 1, wherein said feed means comprises a worm means.

6. Apparatus as defined in claim 1, wherein said means for subjecting the product to a pronounced oscillation comprises means for rotating and oscillating said stirrer and kneading elements independently of the movement of said feed means.

7. Apparatus as defined in claim 1, further including means for rotating said feed means together with said stirrer and kneading elements, the oscillation of said stirrer and kneading elements occurring independently thereof.

8. Apparatus as defined in claim 1, wherein said feed means oscillates together with said stirrer and kneading elements, whereas the rotation of said stirrer and kneading elements takes place independently thereof.

9. Apparatus as defined in claim 1, wherein said means for subjecting the product to a pronounced oscillation includes means for rotating and oscillating said feed means together with said stirrer and kneading elements.

10. Apparatus as defined in claim 1, wherein said apertured plates are of substantially sieve-like construction.

References Cited

UNITED STATES PATENTS

| | | | |
|---|---|---|---|
| 1,796,772 | 3/1931 | Torrance | 165—109 XR |
| 2,635,949 | 4/1953 | Fenske et al. | 23—284 |
| 2,712,799 | 7/1955 | Braibante et al. | |
| 2,815,532 | 12/1957 | Braunlich | 259—4 XR |
| 2,893,846 | 7/1959 | Westrich et al. | 259—4 XR |
| 3,035,303 | 5/1962 | Stanley. | |
| 3,408,051 | 10/1968 | McWhirter | 259—4 |

WILLIAM J. STEPHENSON, Primary Examiner